US008680800B2

(12) United States Patent
Mitomo et al.

(10) Patent No.: US 8,680,800 B2
(45) Date of Patent: Mar. 25, 2014

(54) DRIVING SYSTEM FOR FAN AND METHOD OF DRIVING FAN

(75) Inventors: Shigekazu Mitomo, Nagano (JP); Kevin Yen, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 364 days.

(21) Appl. No.: 13/152,760

(22) Filed: Jun. 3, 2011

(65) Prior Publication Data

US 2011/0298398 A1 Dec. 8, 2011

(30) Foreign Application Priority Data

Jun. 4, 2010 (JP) .................................. 2010-129287

(51) Int. Cl.
*H02P 3/00* (2006.01)

(52) U.S. Cl.
USPC .......................................... 318/461; 388/800

(58) Field of Classification Search
USPC .................... 318/461, 400.01, 400.06, 400.2, 318/400.29; 388/800, 815, 819
See application file for complete search history.

(56) References Cited

U.S. PATENT DOCUMENTS

| 6,747,432 | B2 * | 6/2004 | Yoshimura ..................... 318/599 |
| 6,995,534 | B2 * | 2/2006 | Berroth et al. ........... 318/400.22 |
| 7,276,867 | B2 * | 10/2007 | Alberkrack et al. ...... 318/400.24 |
| 7,518,330 | B2 * | 4/2009 | Lin et al. ....................... 318/599 |
| 7,598,691 | B2 * | 10/2009 | Kuo et al. ..................... 318/434 |
| 2002/0025261 | A1 | 2/2002 | Kudo et al. |
| 2002/0039014 | A1 | 4/2002 | Kudo et al. |
| 2007/0241705 | A1 * | 10/2007 | Karwath ....................... 318/439 |

FOREIGN PATENT DOCUMENTS

| JP | 2002-061596 A | 2/2002 |
| JP | 2002-112570 A | 4/2002 |

* cited by examiner

*Primary Examiner* — Rina Duda
(74) *Attorney, Agent, or Firm* — Rankin, Hill & Clark LLP

(57) ABSTRACT

A driving system for a fan that enables an increase in motor current that may be supplied to excitation windings at the time of a maximum static pressure without increasing the rotational speed excessively when an amount of maximum air flow is provided. The fan driving system includes a drive signal generating circuit that generates drive signals, a motor driving circuit that supplies a motor current to the motor in accordance with the drive signals, a current detecting circuit (resistance) that detects the motor current, and a drive signal changing circuit. The drive signal changing circuit changes the drive signals generated by the drive signal generating circuit to restrict an increase in the motor current when the motor current becomes larger than a threshold.

8 Claims, 7 Drawing Sheets

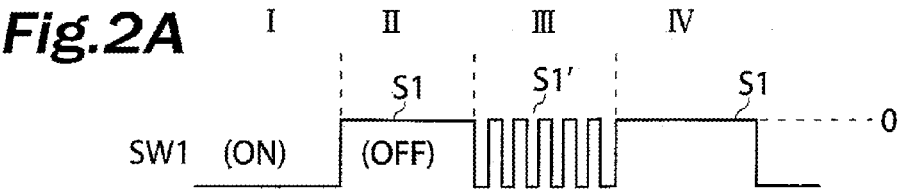
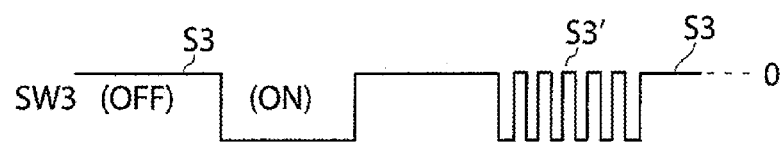
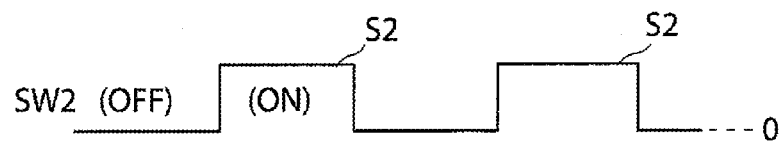
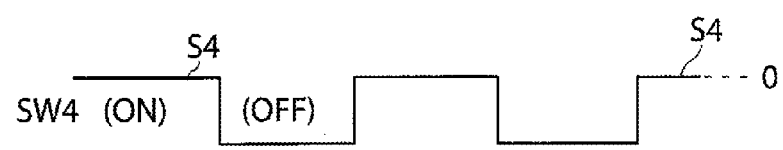
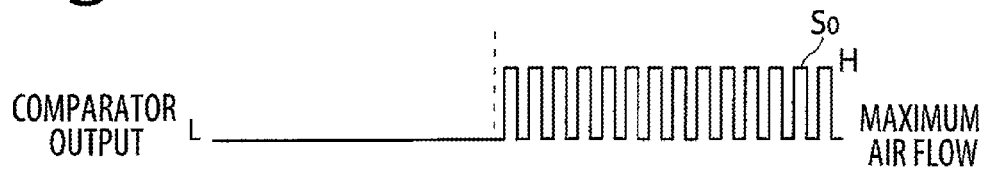

DRIVING SYSTEM FOR FAN AND METHOD OF DRIVING FAN

BACKGROUND OF THE INVENTION

1. Field of the Invention

The present invention relates to a driving system for a fan with a higher maximum static pressure and a method of driving the fan.

2. Description of the Related Art

Japanese Unexamined Patent Application Publication No. 2002-61596 discloses the structure of a centrifugal fan as an example of a fan that includes an impeller and a motor rotating the impeller, and that produces a maximum static pressure when the motor rotates the impeller at a maximum speed and that produces a maximum amount of air flow when the motor rotates the impeller at a minimum speed. Japanese Unexamined Patent Application Publication No. 2002-112570 discloses a driving system for a brushless fan motor including a centrifugal fan and a method of driving the brushless fan motor. FIG. 6 shows an example of the circuit of a conventional driving system for a centrifugal fan. The conventional driving system includes a drive signal generating circuit DSC that generates drive signals S1 to S4, and a motor driving circuit MDC that supplies a motor current to a brushless motor in accordance with the drive signals S1 to S4. The motor driving circuit MDC comprises a bridge circuit including transistors (semiconductor switches) SW1 to SW4, regenerative diodes D1 to D4, and a snubber capacitor C. The drive signal generating circuit DSC detects the rotor position on the basis of an output from a magnetic sensor H of a Hall element that detects magnetism of a plurality of permanent magnets provided in a rotor of the brushless motor, and provides the drive signals S1 to S4 with phase differences shown in FIG. 7 to the respective bases of the transistors SW1 to SW4 in accordance with the detected rotor position. The motor driving circuit MDC alternately brings a pair of the transistors SW1 and SW4 and a pair of the transistors SW2 and SW3 into conduction to cause an AC motor current to flow through excitation windings W in order to drive the brushless motor.

As shown in FIG. 8, a fan such as a centrifugal fan has an operational characteristic such that the rotational speed V increases as the static pressure approaches the maximum static pressure MP, and such that the motor current decreases as the static pressure approaches the maximum static pressure MP. FIGS. 9A and 9B show the waveform of the motor current when the conventional driving system generates a maximum amount of air flow and the waveform of the motor current when the conventional driving system generates a maximum static pressure, respectively, corresponding to operating regions I to IV of FIG. 7. As shown in FIG. 9B, when the maximum static pressure is produced, the motor current is decreased, and therefore the torque is also decreased. Consequently, in order to increase the maximum static pressure MP without changing the maximum amount of air flow MQ and power consumption, it is required to increase the motor current supplied to the excitation windings W of the motor at the time of the maximum static pressure MP to increase the torque to secure the required rotational speed.

If the excitation windings W with specifications required to obtain a rotational speed required for the maximum static pressure MP are used with the conventional driving system shown in FIG. 6, however, the rotational speed may become excessive at the time of the maximum amount of air flow MQ to consume excessive power.

SUMMARY OF THE INVENTION

An object of the present invention is to provide a driving system for a fan and a driving method thereof that enable an increase in motor current that may be supplied to excitation windings at the time of a maximum static pressure without increasing the rotational speed excessively at the time of a maximum amount of air flow.

Another object of the present invention is to provide a driving system for a fan and a driving method thereof that enable a change to the setting of the maximum amount of air flow in addition to the above object.

The present invention improves a driving system for a fan that includes an impeller and a motor rotating the impeller, and that produces a maximum static pressure when the motor rotates the impeller at a maximum speed and that produces a maximum amount of air flow when the motor rotates the impeller at a minimum speed. The driving system for a fan according to the present invention includes a drive signal generating circuit that generates drive signals, a motor for driving circuit that supplies a motor current to the motor according to the drive signals, a current detecting circuit that detects the motor current, and a drive signal changing circuit. The drive signal changing circuit changes the drive signals generated by the drive signal generating circuit to restrict an increase in the motor current when the motor current becomes larger than a predetermined threshold. According to the present invention, the drive signal changing circuit functions to restrict an increase in motor current (perform current restricting control) when the motor current becomes larger than the predetermined threshold. Therefore, it is possible to prevent the rotational speed at the time of a maximum amount of air flow from becoming excessive even if the specifications (number of windings) of the excitation windings are determined to increase the motor current that may be supplied to the excitation windings at the time of a maximum static pressure. Viewed from another aspect, according to the present invention, the maximum static pressure can be enhanced without changing the maximum amount of air flow depending on the setting of the threshold. Alternatively, desired maximum static pressure and maximum amount of air flow can be obtained depending on how the threshold is determined. Thus, the specifications of the excitation windings and the threshold may be appropriately determined according to the required maximum static pressure and maximum amount of air flow.

The fan driving system may further include a threshold changing circuit that changes the threshold as desired. Providing the threshold changing circuit allows the maximum amount of air flow to be set as desired according to the application purpose.

The motor driving circuit may include a plurality of semiconductor switches connected to excitation windings of the motor to cause the motor current to flow through the excitation windings. In this case, the drive signal changing circuit may chop the drive signal provided to one of the semiconductor switches in pairs that are turned on at the same time among the plurality of semiconductor switches in the motor driving circuit. With such a configuration, the motor current can be restricted smoothly rather than abruptly. Specifically, the current detecting circuit may be configured to output voltage corresponding to the motor current. In addition, the drive signal changing circuit may include a comparator that compares the voltage corresponding to the motor current and a voltage threshold to output an output signal for a period for which the voltage is larger than the voltage threshold, and a chopping circuit that chops the drive signal by not providing the drive signal to the one of the semiconductor switches for a period for which the output signal is output. If the voltage threshold is used, the threshold changing circuit is configured to change the voltage threshold. The drive signal changing circuit may have any circuit configuration that can suppress the motor current without reducing the maximum static pressure.

The present invention also provides a method of driving a fan that includes an impeller and a motor rotating the impeller, and that produces a maximum static pressure when the motor rotates the impeller at a maximum speed and that produces a maximum amount of air flow when the motor rotates the impeller at a minimum speed. The method according to the present invention includes the step of restricting an increase in a motor current supplied to the motor such that a value of the motor current does not become larger than a predetermined threshold. Here, the phrase "a value of the motor current does not become larger than a predetermined threshold" means to perform current restricting control such that the value of the motor current does not continuously exceed the threshold, rather than such that the value of the motor current never exceeds the threshold. Thus, the motor current may exceed the threshold during the current restricting control. According to the method of the present invention, an increase in motor current is restricted such that the motor current does not become larger than the threshold. Therefore, it is possible to prevent the rotational speed (motor current) at the time of a maximum amount of air flow from becoming excessive even if the specifications of the excitation windings are determined to increase the motor current that may be supplied to the excitation windings at the time of a maximum static pressure. Viewed from another aspect, the specifications of the excitation windings and the threshold may be set to increase the maximum static pressure without changing the maximum amount of air flow.

The method of the present invention also allows changing the maximum amount of air flow by changing the threshold.

BRIEF DESCRIPTION OF THE DRAWINGS

FIGS. 2A to 2F show respective operating waveforms of circuit components shown in FIG. 1.

DESCRIPTION OF THE PREFERRED EMBODIMENTS

Figure 1:
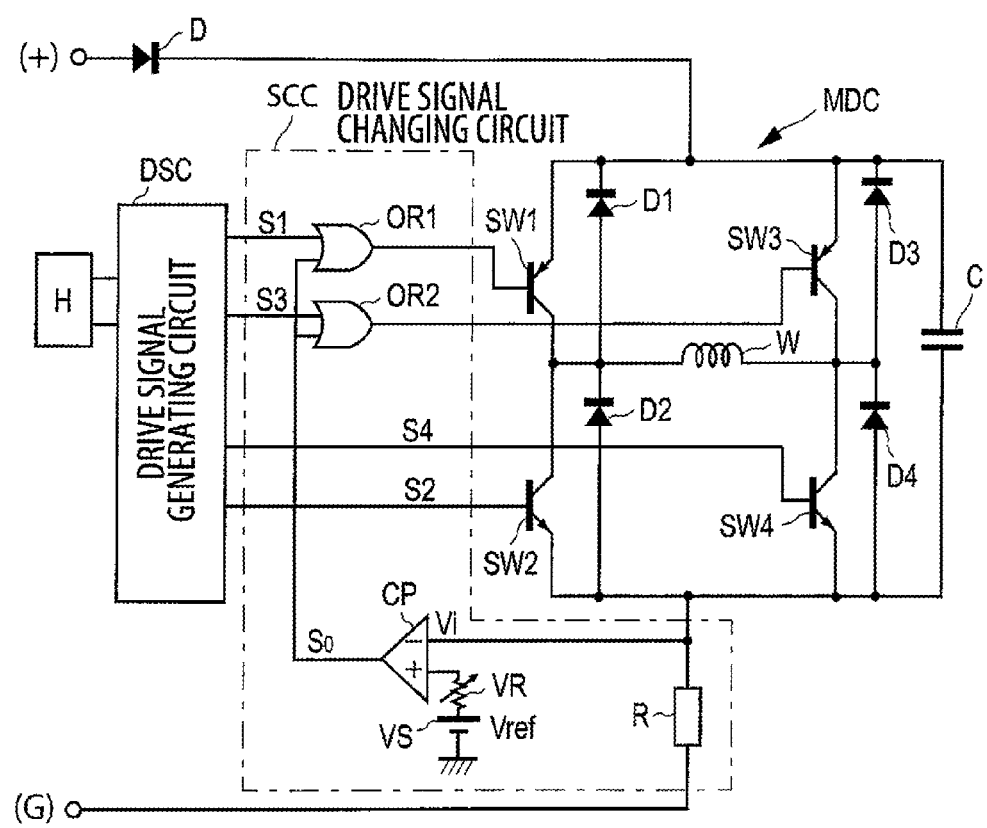
FIG. 1 shows the circuit configuration of a driving system for a centrifugal fan according to an embodiment of the present invention.
Figure 6:
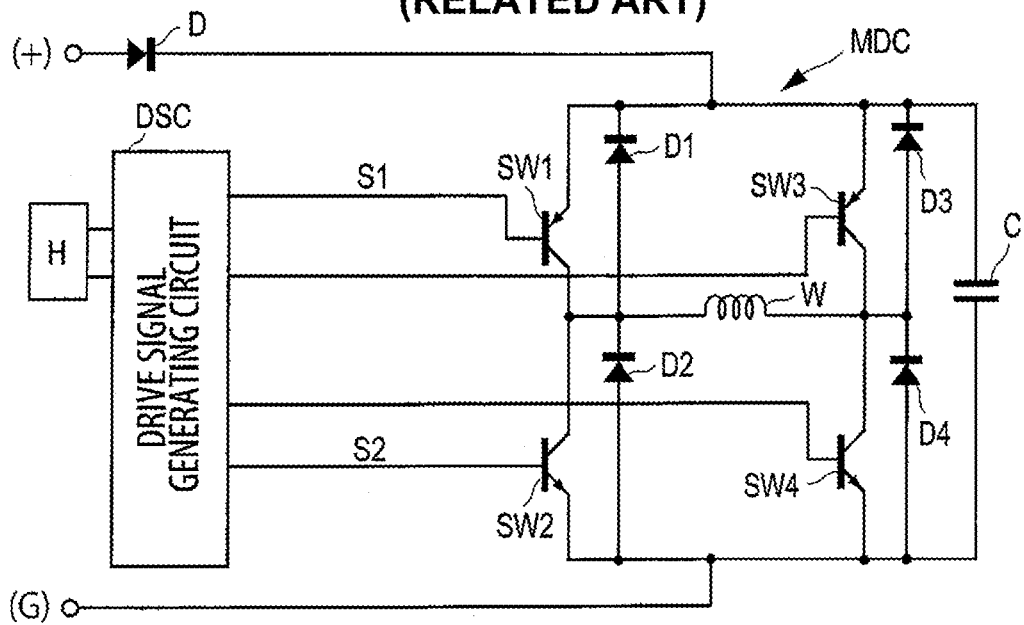
FIG. 6 shows an example of the circuit configuration of a driving system for a centrifugal fan according to the related art.
Figure 7A:
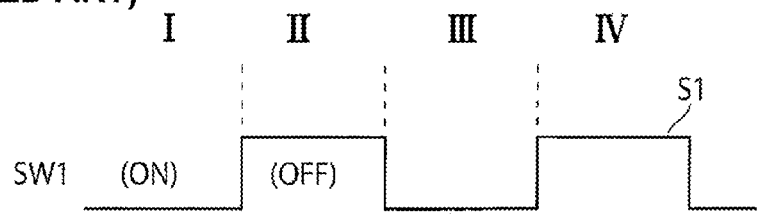
FIGS. 7A to 7D show the waveforms of drive signals for circuit components shown in FIG. 6.
Figure 7B:
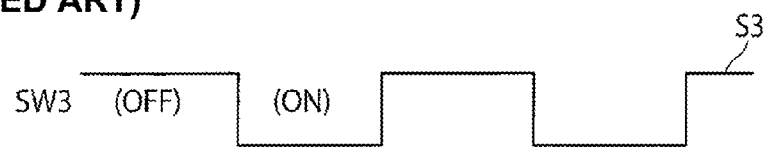
Figure 7C:
Figure 7D:
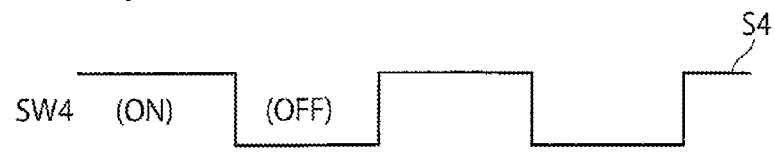
Figure 8:
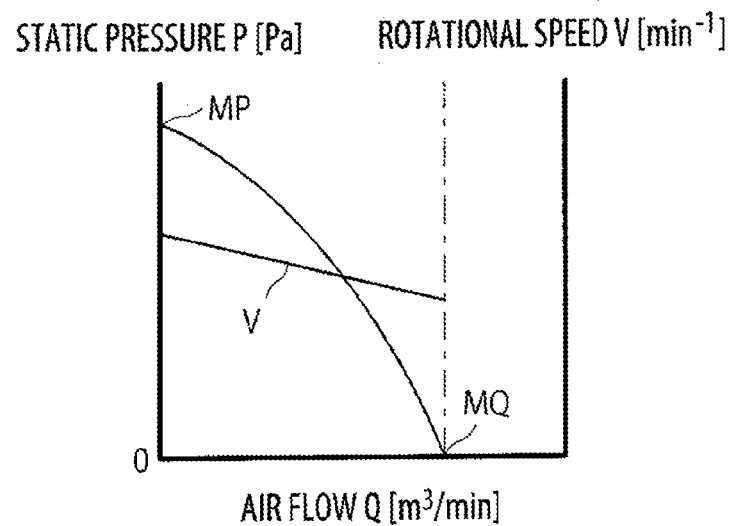
FIG. 8 shows the static pressure and air flow characteristics used to illustrate the characteristics of a centrifugal fan.
Figure 9A:
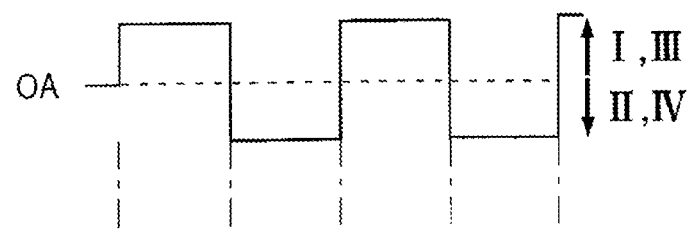
FIGS. 9A and 9B show the waveform of the motor current when the conventional driving system generates a maximum amount of air flow and the waveform of the motor current when the conventional driving system generates a maximum static pressure, respectively.
Figure 9B:
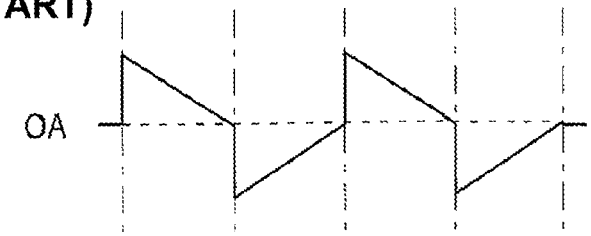

A driving system for a fan and a method of driving a fan according to an embodiment of the present invention will be described in detail below with reference to the drawings. FIG. 1 shows the circuit of a driving system for a centrifugal fan according to an embodiment of the present invention. Components that are the same as those of the circuit according to the conventional driving system shown in FIG. 6 are denoted by reference numerals that are the same as those given in FIG. 6.

In the embodiment of FIG. 1, a drive signal generating circuit DSC generates drive signals S1 to S4 with a predetermined cycle. A motor driving circuit MDC comprises a bridge circuit including transistors (semiconductor switches) SW1 to SW4, regenerative diodes D1 to D4, and a snubber capacitor C. The drive signal generating circuit DSC detects the rotor position on the basis of an output from a magnetic sensor H of a Hall element that detects magnetism of a plurality of permanent magnets provided in a rotor of the brushless motor, and provides the drive signals S1 to S4 with phase differences shown in FIGS. 2A to 2D to the respective bases of the transistors SW1 to SW4 according to the detected rotor position. The motor driving circuit MDC alternately brings a pair of the transistors SW1 and SW4 and a pair of the transistors SW2 and SW3 into conduction to cause an AC motor current to flow through excitation windings W in order to drive the brushless motor.

In order to intentionally change the rotational speed of the rotor (rotational speed of the motor), the cycle (frequency) of the drive signals S1 to S4 is changed. In the embodiment, however, the cycle (frequency) of the drive signals S1 to S4 is not changed. In operating regions I and II of FIGS. 2A to 2D, the drive signals S1 to S4 at the time of a maximum amount of air flow are shown. In operating regions III and IV of FIGS. 2A to 2D, the drive signals S1 to S4 at the time of a maximum static pressure are shown. The transistors SW1 and SW3 serving as semiconductor switches are pnp transistors, and the transistors SW2 and SW4 serving as semiconductor switches are npn transistors. Therefore, the respective polarities of the drive signals S1 and S3, and of the drive signals S2 and S4 are opposite to each other, when the transistors are turned on and off.

In the embodiment, OR circuits OR1 and OR2 are disposed in signal lines through which the drive signals S1 and S3 are supplied to the transistors SW1 and SW3, respectively. In the embodiment, a resistance R for motor current detection is disposed between the respective emitters of the transistors SW2 and SW4 and the ground G. The value of a voltage Vi appeared across the resistance R (voltage corresponding to the motor current) is proportional to the value of the motor current. Thus, in the embodiment, the resistance R serves as a current detecting circuit. The ungrounded terminal of the resistance R is connected to one input terminal (− terminal) of a comparator CP. A reference voltage source VS that provides a voltage threshold Vref is connected to the other input terminal (+ terminal) of the comparator CP via a variable resistor VR. Thus, the comparator CP compares the voltage Vi which is proportional (corresponds) to the motor current and the voltage threshold Vref to output an output signal S0 when the voltage Vi becomes equal to or more than the voltage threshold Vref. The voltage threshold Vref can be changed by changing the resistance value of the variable resistor VR. The voltage threshold Vref can be compared with the voltage Vi which is proportional (corresponds) to the motor current. The comparison between the two voltages performed by the comparator CP is equivalent to a determination as to whether or not the value of the motor current exceeds a current value determined by a predetermined threshold Ilim. The voltage threshold Vref is determined to be smaller than the theoretical value (a voltage threshold that perfectly corresponds to the threshold Ilim) such that the value of the motor current does not continuously exceed the predetermined threshold Ilim.

Figure 3A:
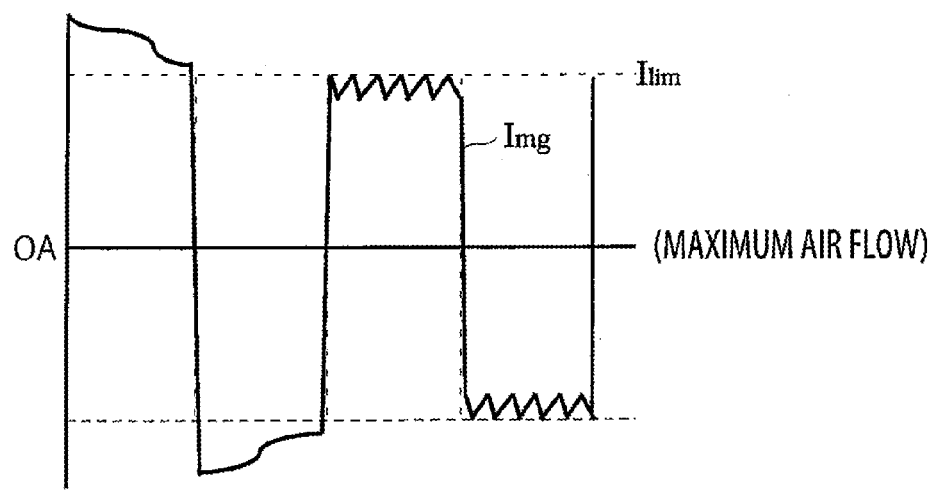
FIGS. 3A and 3B show an example of a motor current waveform for a case where current restricting control is performed and for a case where the current restricting control is not performed, respectively.

FIG. 2E shows the output signal S0 of the comparator CP at the maximum amount of air flow. FIG. 2F shows the output state of the comparator CP at the maximum static pressure. As shown in FIG. 2E, when the voltage Vi exceeds the voltage threshold Vref, the output signal S0 becomes a plurality of pulse signals for one cycle of the drive signal. That is, the output signal S0 in a "H (high)" state is output for a period for which the voltage Vi exceeds the threshold Vref, and input to the OR circuits OR1 and OR2. As a result, the drive signal is chopped by the output signal S0, which activates current restricting control to suppress an increase in motor current. When the motor current is suppressed, the voltage Vi becomes smaller than the threshold Vref, and therefore the output signal. S0 in the "H (high)" state is not output. When the output signal S0 is not output, the current restricting control is deactivated, and the motor current is again such that the voltage Vi exceeds the threshold Vref. As a result, the comparator CP outputs the output signal S0 again. These operations are repeated thereafter, and the motor current is restricted such that the motor current does not continuously exceed the threshold Ilim. FIG. 3A roughly shows the waveform of the motor current at the time when the maximum amount of air flow is obtained. As seen from the drawing, the motor current does not continuously exceed the current threshold (Ilim) determined by the threshold Vref.

Figure 3B:
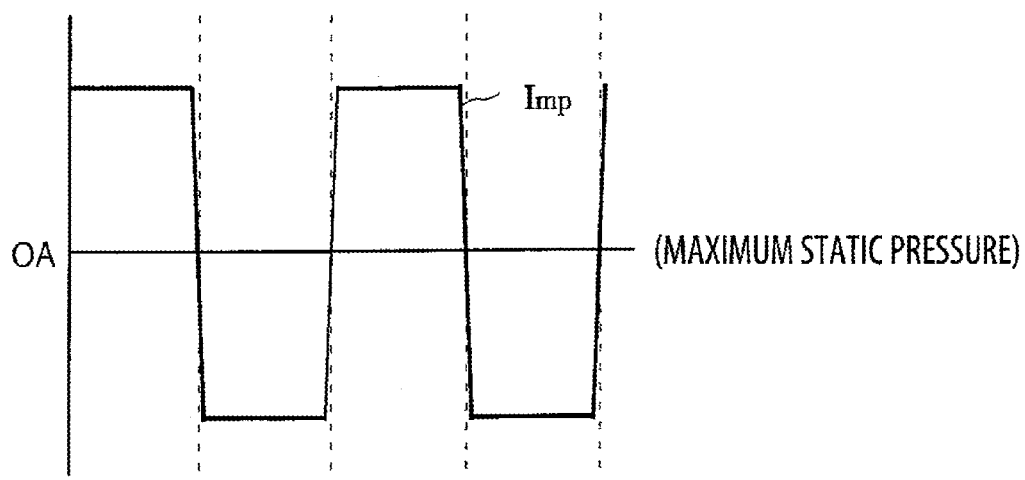

The OR circuit OR1 receives the drive signal S1, which becomes negative to turn on the transistor SW1 and becomes 0 to turn off the transistor SW1 as shown in FIG. 2A, and the output signal S0. The OR circuit OR1 outputs a drive signal S1' which provides a base current to the transistor SW1 for a period for which the output signal S0 is not input. That is, the drive signal S1 is chopped by the output signal S0 to derive the drive signal S1'. Likewise, the OR circuit OR2 receives the drive signal S3, which becomes negative to turn on the transistor SW3 and becomes 0 to turn off the transistor SW3 as shown in FIG. 2B, and the output signal S0. The OR circuit OR2 outputs a drive signal S3' which provides a base current to the transistor SW3 for a period for which the output signal S0 is not input. That is, the drive signal S3 is chopped by the output signal S0 to derive the drive signal S3', FIG. 2F shows the output state of the comparator CP at the time when the maximum static pressure is obtained. At this time, the output of the comparator CP is in a "L (low)" state, and the OR circuits OR1 and OR2 output the drive signals S1 and S3 which are provided to the transistors SW1 and SW3, respectively. That is, the current restricting control is not performed in this state. This state continues until the motor current exceeds the threshold Ilim (that is, the voltage Vi exceeds the voltage threshold Vref). FIG. 3B shows the motor current Imp at the time when the current restricting control is not performed such as at the maximum static pressure. As shown in FIG. 3S, the current restricting control is not performed on the motor current.

In the embodiment, the resistance R for current detection, the comparator CP, and the OR circuits OR1 and OR2 construct a drive signal changing circuit SCC that changes the drive signals S1 and S3 generated by the drive signal generating circuit DSC to restrict an increase in motor current. In addition, the OR circuits OR1 and OR2 construct a chopping circuit that chops the drive signals S1 and S3 and provides the chopped signals to the transistors SW1 and SW3 serving as semiconductor switches for a period for which the output signal S0 is output, without providing the drive signals S1 and S3 to the transistors SW1 and SW3.

Figure 4:
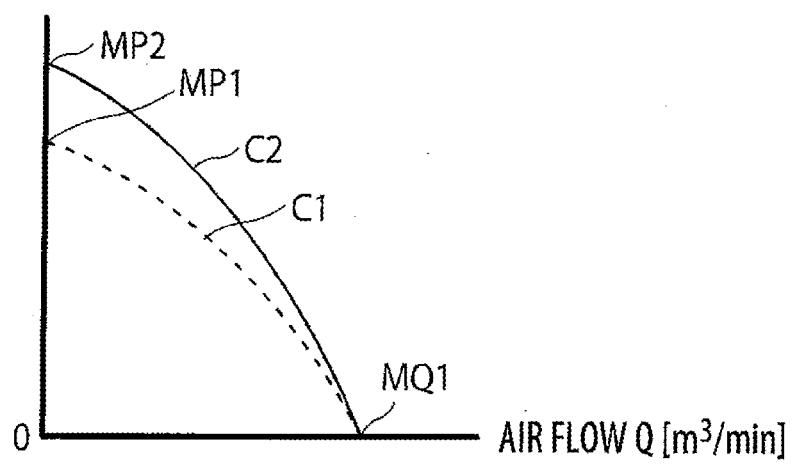
FIG. 4 illustrates variations in static pressure and air flow characteristics for a case where a method according to the present invention is performed.

Next, a method according to the present invention of driving a centrifugal fan using the driving system according to the above embodiment will be described. The method according to the present invention includes the step of restricting an increase in motor current supplied to the excitation windings W of the motor such that the value of the motor current does not become larger than (does not continuously exceed) the threshold Ilim. In FIG. 4, for example, the curve C1 indicated by a broken line indicates the static pressure and air flow characteristics when the centrifugal fan is controlled by the conventional driving system, and the curve C2 indicated by a solid line indicates the static pressure and air flow characteristics when the centrifugal fan is controlled by the driving system according to the above embodiment. In order to obtain the maximum static pressure MP2 more than the maximum static pressure obtained by the conventional driving system (MP1→MP2), the specifications (number of windings) of the excitation windings W are determined to increase the motor current that may be supplied to the excitation windings W at the time of the maximum static pressure MP2. Then, an increase in motor current is restricted such that the motor current does not become larger than the threshold Ilim. In this way, it is possible to prevent the rotational speed (motor current) at the time of the maximum amount of air flow MQ1 from becoming excessive. As a result, the maximum static pressure can be increased (MP1→M92) without changing the maximum amount of air flow MQ1 as shown in FIG. 4.

Figure 5:
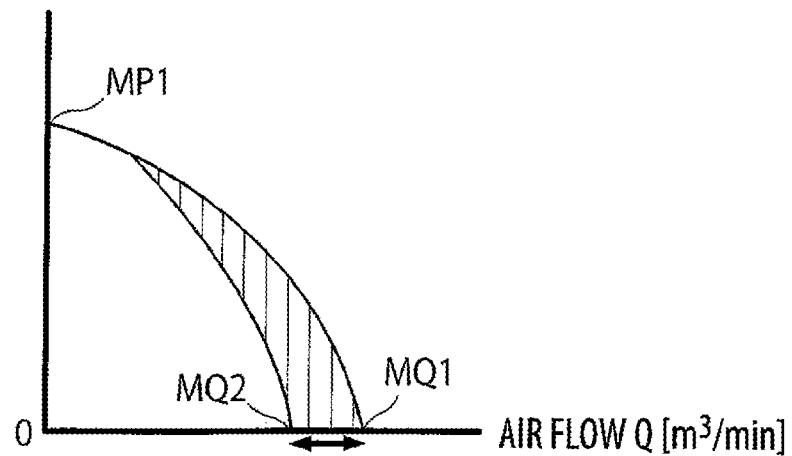
FIG. 5 illustrates a case where the maximum amount of air flow is changed in accordance with the present invention.

Another method of driving a centrifugal fan using the driving system according to the above embodiment will be described. In the method, as in the above embodiment, the threshold Vref is changed using a threshold changing circuit formed by the variable resistor VR. When the threshold is changed, the operation point at which restriction on the motor current is started is changed. Therefore, the maximum amount of air flow can be set or changed in a desired range (MQ1 to MQ2) as shown in FIG. 5.

In the above embodiment, the drive signal changing circuit SCC is configured to chop the drive signals S1 and 53 respectively provided to one transistor (semiconductor switch) SW1 of the transistors (semiconductor switches) SW1 and SW4 in pair and one transistor (semiconductor switch) SW3 of the transistors (semiconductor switches) SW2 and SW3 in pair which are turned on at the same time in the motor driving circuit MDC. In order to restrict an increase in motor current (to perform the current restricting control), however, operating signals for all the transistors SW1 to SW4 may be chopped. It is a matter of course that the drive signal changing circuit may be formed by a PWM control circuit to restrict the motor current.

Further, the present invention is not limited to the above embodiment, but various variations and modification may be made without departing from the scope of the present invention.

What is claimed is:

1. A driving system for a fan that includes an impeller and a motor for rotating the impeller, and that produces a maximum static pressure when the motor rotates the impeller at a maximum speed and that produces a maximum amount of air flow when the motor rotates the impeller at a minimum speed, the driving system comprising;

a drive signal generating circuit that generates drive signals;

a motor driving circuit that supplies a motor current to the motor according to the drive signals;

a current detecting circuit that detects the motor current; and a drive signal changing circuit that changes the drive signals generated by the drive signal generating circuit to restrict an increase in the motor current when the motor current becomes larger than a predetermined threshold set to enhance the maximum static pressure without changing the maximum amount of air flow.

2. The driving system for a fan according to claim 1, wherein:
the motor driving circuit includes a plurality of semiconductor switches connected to one or more excitation windings of the motor to cause the motor current to flow through the one or more excitation windings; and
the drive signal changing circuit chops the drive signal provided to one of the semiconductor switches in pairs that are turned on at the same time among the plurality of semiconductor switches.

3. The driving system for a fan according to claim 2, wherein
the current detecting circuit is configured to output voltage corresponding to the motor current; and
the drive signal changing circuit includes:
a comparator that compares the voltage corresponding to the motor current and a voltage threshold corresponding to the predetermined threshold to output an output signal for a period for which the voltage is larger than the voltage threshold; and
a chopping circuit that chops the drive signal by not providing the drive signal to the one of the semiconductor switches for a period for which the output signal is output.

4. The driving system for a fan according to claim 1, further comprising
a threshold changing circuit that changes the voltage threshold.

5. The driving system for a fan according to claim 2, further comprising
a threshold changing circuit that changes the voltage threshold.

6. The driving system for a fan according to claim 3, further comprising
a threshold changing circuit that changes the voltage threshold.

7. A method of driving a fan that includes an impeller and a motor for rotating the impeller, and that produces a maximum static pressure when the motor rotates the impeller at a maximum speed and that produces a maximum amount of air flow when the motor rotates the impeller at a minimum speed, comprising the step of
restricting an increase in a motor current supplied to the motor such that a value of the motor current does not become larger than a threshold set to enhance the maximum static pressure without changing the maximum amount of air flow.

8. The method of driving a fan according to claim 7, wherein the maximum amount of air flow is changed by changing the threshold.

* * * * *